United States Patent
Zapotylok

(10) Patent No.: US 12,461,659 B2
(45) Date of Patent: Nov. 4, 2025

(54) COMMAND LOOPBACK FOR POWER LOSS PROTECTION (PLP) ABORT IN DATA STORAGE DEVICE

(71) Applicant: SK hynix Inc., Icheon-si (KR)

(72) Inventor: Alexander Zapotylok, Minsk (BY)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/181,277

(22) Filed: Mar. 9, 2023

(65) Prior Publication Data
US 2024/0302975 A1    Sep. 12, 2024

(51) Int. Cl.
*G06F 3/06* (2006.01)

(52) U.S. Cl.
CPC .......... *G06F 3/0619* (2013.01); *G06F 3/0659* (2013.01); *G06F 3/0688* (2013.01)

(58) Field of Classification Search
CPC ..... G06F 3/0619; G06F 3/0659; G06F 3/0688
See application file for complete search history.

(56) References Cited

U.S. PATENT DOCUMENTS

| | | | |
|---|---|---|---|
| 8,417,866 B2 | 4/2013 | Chang et al. | |
| 10,013,173 B2* | 7/2018 | More | G06F 13/4286 |
| 10,802,753 B2 | 10/2020 | Kabra et al. | |
| 2004/0153711 A1* | 8/2004 | Brunelle | G06F 3/0601 |
| | | | 714/4.5 |
| 2014/0337562 A1* | 11/2014 | Long | G06F 3/0679 |
| | | | 711/126 |
| 2015/0242123 A1* | 8/2015 | Lee | G06F 3/0679 |
| | | | 710/7 |
| 2019/0108090 A1* | 4/2019 | Shen | G11C 11/5628 |

* cited by examiner

*Primary Examiner* — Masud K Khan
(74) *Attorney, Agent, or Firm* — Perkins Coie LLP

(57) ABSTRACT

Disclosed are methods and systems that can perform a loopback operation during a power loss protection (PLP) procedure. In some implementations, a method includes identifying, upon issuance of a command abort signal for aborting a command queued in the memory system, a current state of the command, receiving, by the memory system, one or more input/output (IO) packets corresponding to the current state of the command, and performing operations corresponding to the command on the one or more IO packets.

20 Claims, 9 Drawing Sheets

COMMAND LOOPBACK FOR POWER LOSS PROTECTION (PLP) ABORT IN DATA STORAGE DEVICE

TECHNICAL FIELD

This patent document relates to semiconductor memories and data storages including the semiconductor memories.

BACKGROUND

Semiconductor-based data storage devices such as solid state drives (SSDs) are actively being used in computing systems, due to their improved performance and decreased mechanical reliability compared to hard disk drives (HDDs). A data storage device includes a controller and other hardware components in communication with the computing system via an interface protocol, and data storage elements in the SSD are connected to the controller and hardware components via a device interface. In addition, a variety of software components, operating systems, and firmware may be integrated into the data storage device.

SUMMARY

Embodiments of the disclosed technology relate to methods and systems that, among other features and benefits, can perform a loopback operation during a power loss protection (PLP) procedure.

In an embodiment of the disclosed technology, a method includes identifying, upon issuance of a command abort signal for aborting a command queued in the memory system, a current state of the command, receiving, by the memory system, one or more input/output (IO) packets corresponding to the current state of the command, and performing operations corresponding to the command on the one or more IO packets.

In another embodiment of the disclosed technology, a method includes receiving one or more first input/output (IO) packets corresponding to a command queued in the memory system, determining, upon issuance of a command abort signal for aborting the command queued in the memory device, whether a power loss protection (PLP) loopback operation is being performed on the memory system, identifying a current state of the command upon determining that the PLP loopback operation is being performed on the memory system, and determining whether to receive one or more second IO packets to complete an entire operation of the command or to complete the entire operation of the command without receiving the one or more second IO packets, according to the current state of the command.

In another embodiment of the disclosed technology, a memory system may include an I/O interface communicatively coupled to a host device to receive a command and input/output (IO) packets corresponding to the command, a memory to store executable instructions, and a processor in communication with the memory, configured to read the executable instructions from the memory to: identify, upon issuance of a command abort signal for aborting a command queued in the memory system, a current state of the comma; receive one or more IO packets corresponding to the current state of the command; and perform operations corresponding to the command on the one or more IO packets.

DETAILED DESCRIPTION

Figure 1:
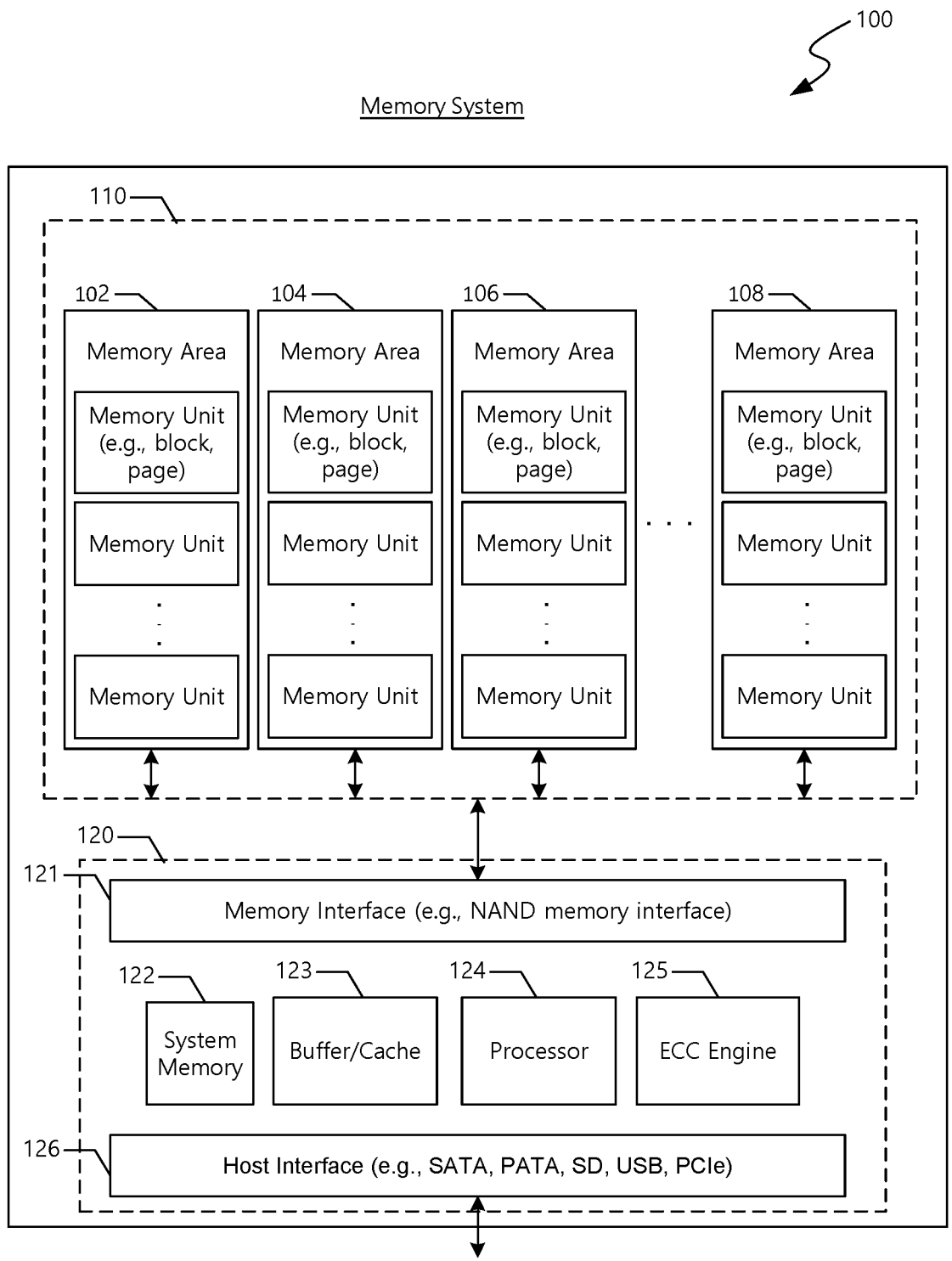
FIG. 1 illustrates an example of a memory system implemented based on some embodiments of the disclosed technology.

FIG. 1 illustrates an example of a memory system 100 implemented based on some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, or 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a bank, block, or page that can be identified by a unique address such as bank address, block address, and page basis address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change memory (PRAM) cells, magnetoresistive random-access memory (MRAM) cells, or other types of nonvolatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 111 can be configured to store at least one bit of information (e.g., one bit of information or multiple bits of information), and each of the memory cells in memory area 112 can be configured to store more than one bit of information.

As shown in FIG. 1, the memory system 100 includes a controller module 120. The controller module 120 includes a memory interface 121 to communicate with the memory module 110, a host interface 126 to communicate with a host (not shown), a processor 124 to executes firmware-level code, and caches and memories 122 and 123 to temporarily or persistently store executable firmware/instructions and associated information. In some implementations, the controller unit 120 can include an error correction engine 125 to perform error correction operation on information stored in the memory module 110. Error correction engine 122 can be configured to detect/correct single bit error or multiple bit errors. In another implementation, error correction engine 125 can be located in the memory module 110.

The host can be a device or a system that includes one or more processors that operate to retrieve data from the memory system 100 or store or write data into the memory system 100. In some implementations, examples of the host can include a personal computer (PC), a portable digital device, a digital camera, a digital multimedia player, a television, and a wireless communication device.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

Figure 2:
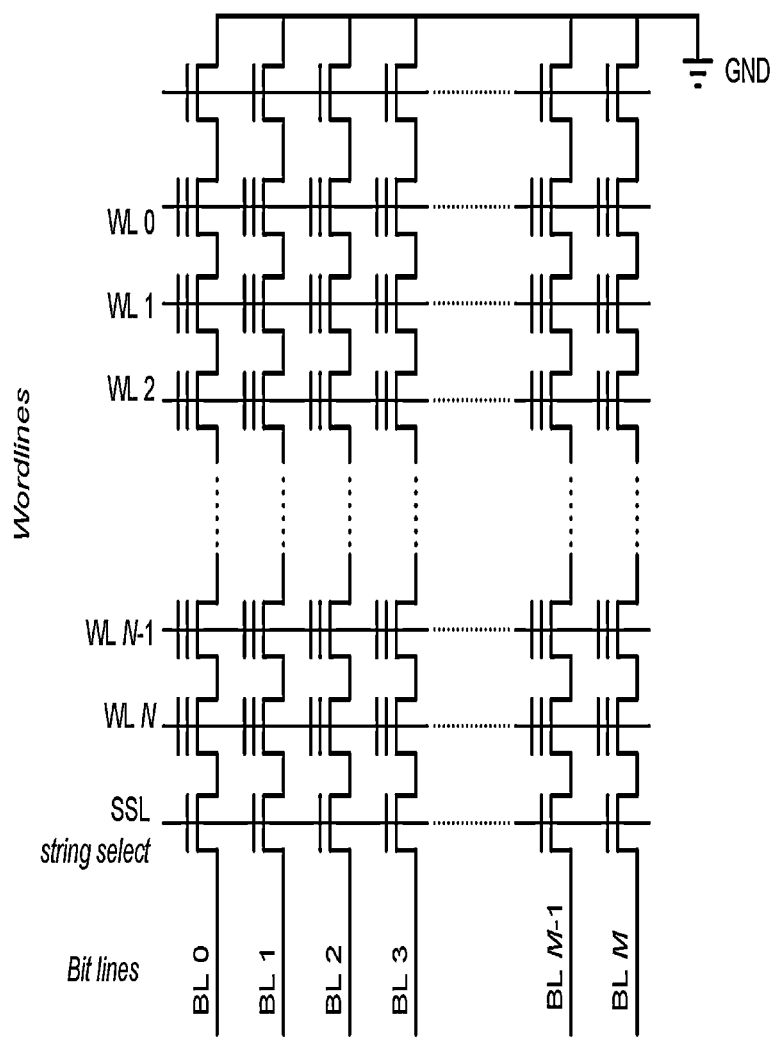
FIG. 2 illustrates an example of a memory cell array implemented based on some embodiments of the disclosed technology.

FIG. 2 illustrates an example of a memory cell array implemented based on some embodiments of the disclosed technology.

In some implementations, the memory cell array can include a NAND flash memory array that is partitioned into many blocks, and each block contains a certain number of pages. Each block includes a plurality of memory cell strings, and each memory cell string includes a plurality of memory cells.

In some implementations where the memory cell array is NAND flash memory array, read and write (program) operations are performed on a page basis, and erase operations are performed on a block basis. All the memory cells within the same block must be erased at the same time before performing a program operation on any page included in the block. In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

A power loss protection (PLP) procedure in an enterprise SSD is a very important feature. The PLP procedure is a mechanism to ensure that the data is not lost while the SSD is writing data when a sudden power loss occurs. In some implementations, the PLP requires a printed circuit board (PCB) to include capacitors thereon to provide backup power to completely write the last data from storage cache into the NAND flash when a sudden power loss occurs, thereby saving host write buffers. However, one of the most important aspects to consider when designing data storage devices such as solid-state drives (SSDs) is power consumption. In order to reduce power consumption of SSDs while minimizing the cost of production, a NAND command abort scheme can be used. Semiconductor memory devices (e.g., NAND die) in a data storage device (e.g., SSD) may be used to run power-consuming programs or to execute erase commands on the semiconductor memory devices, which require high voltages. However, an abort command such as NAND command abort can immediately abort commands being executed, such as commands associated with power-consuming programs or erase commands. Once all of the running programs and commands are terminated, the states of hardware (HW) modules and firmware (FW) modules transition to "idle" states, and thus, for example, all hardware blocks and firmware variables are reset to their initial states. However, as a result, the verification complexity of HW/System On Chip (SoC) may increase because it should be verified to be reset at any moment. In some implementations, FW can simulate the normal workflow for HW/SoC interfaces to avoid the need to reset it. The disclosed technology can be implemented in some embodiments to perform a "loopback" operation to simulate the normal workflow for HW/SoC interfaces.

Figure 3:
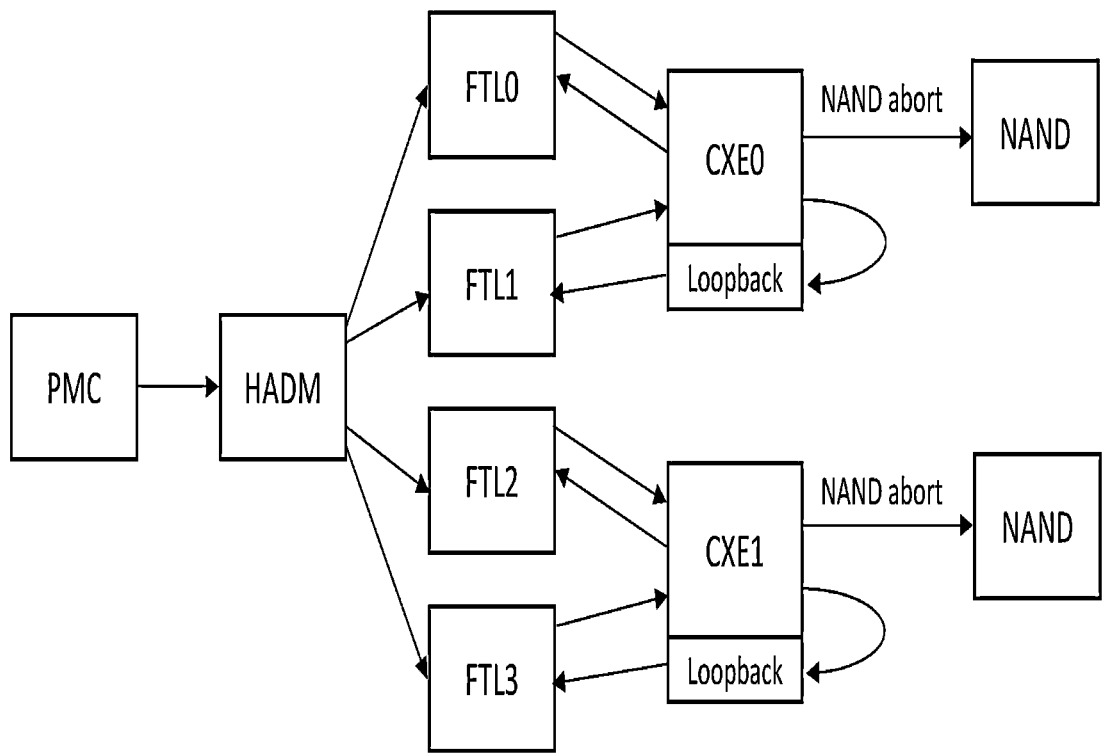
FIG. 3 shows an example of a power loss protection procedure based on some embodiments of the disclosed technology.

FIG. 3 shows an example of a power loss protection procedure based on some embodiments of the disclosed technology.

In some embodiments of the disclosed technology, a loopback is a command completion process during which all operations of FW running on CPU cores are performed through a normal command path. In one example, during this process, a lower layer in the system does not actually issue any NAND commands but immediately returns a successful response back to an upper layer. During this process, all HW blocks do not go beyond the well verified timing and logic path.

Figure 4:
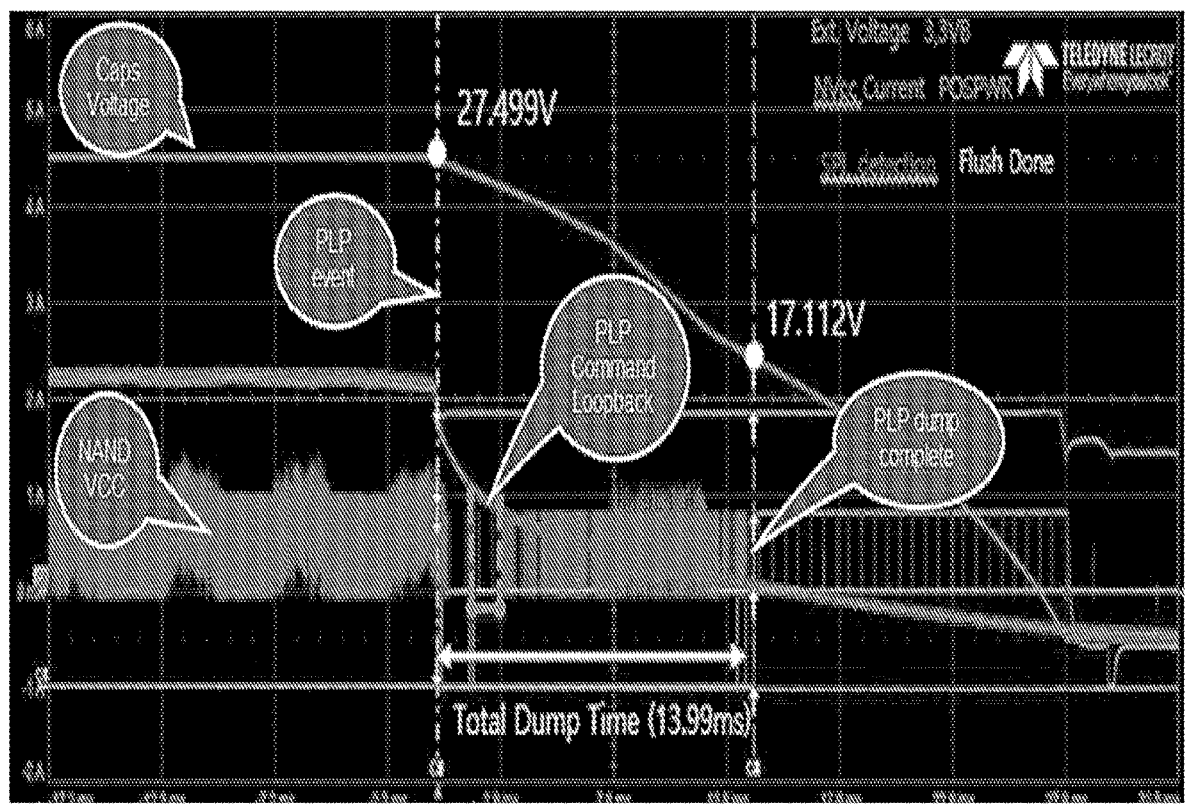
FIG. 4 shows an example of a power loss protection procedure on an oscilloscope based on some embodiments of the disclosed technology.

FIG. 4 shows an example of a power loss protection procedure on an oscilloscope based on some embodiments of the disclosed technology.

In some embodiments of the disclosed technology, a number of signals on the oscilloscope, as such NAND VCC, external power and capacitor voltage change can represent a PLP procedure workflow as will be discussed below:

1. During a sudden power loss scenario, semiconductor memory devices (e.g., NAND dies) are normally utilized as indicated as a continuous flow of a power supply voltage (e.g., NAND VCC).

2. Capacitors are fully charged at 27.499V.

3. Upon occurrence of a power loss event that requires a PLP procedure, the supply of the power supply voltage (e.g., NAND VCC) may be immediately discontinued in response to the NAND command abort.

4. In some embodiments of the disclosed technology, the NAND flash controller state is transitioned to an idle state. In one example, this procedure takes 300 microseconds in the below example. In another example, the time it takes to complete this procedure may vary depending on the workload.

5. Finally, a controller or processor (e.g., Flash CPU) prepares for a flush of host data/meta data from write buffers to NAND, as indicated by the growing NAND VCC flow ending at 17.112V capacitor state.

In some embodiments of the disclosed technology, a PLP loopback takes 3 us per erase command (e.g., single input/output operation per second (IOP)), 9 us per read command in average (e.g., up to 16 IOPS per command) and 20 us per program command in average (e.g., either 16 or 48 IOPS per command). The measurement only includes the firmware part. In contrast, a full flash controller NAND processor reset takes 3.5 ms after optimization, and an individual module reset is not supported by HW architecture in the controller provided. This also justifies the need for such a feature for some controllers. All commands are stacked to one CPU, which means that, while the loopback CPU is processing one command, the other command is delayed until the processing of the previous command is successfully completed. The more there are outstanding commands, the less effective this procedure would be. However, in some implementations, the number of commands does not exceed 3 commands per a single die. In some embodiments of the disclosed technology, the loopback process can support the PLP command abort process without requiring anything to be done by the HW architecture, and thus the SoC verification process may become much easier.

In some embodiments of the disclosed technology, the loopback process includes: identifying the current command state (e.g., program or erase, how many IO packets are already transferred, what phase these packets are going through right now); downloading the remaining IO packets from the upper layer; simulating IO packet regular handling; and completing successfully the entire command that includes N packets in one shot to the upper layer. In some implementations, the IO packets may include data to be written to or read from semiconductor memory devices (e.g., NAND flash memory devices) in a data storage device (e.g., SSD). In some implementations, the IO packets may include information associated with memory operations of the semiconductor memory devices, such as read operations, program (or write) operations, and erase operations.

Figure 5:
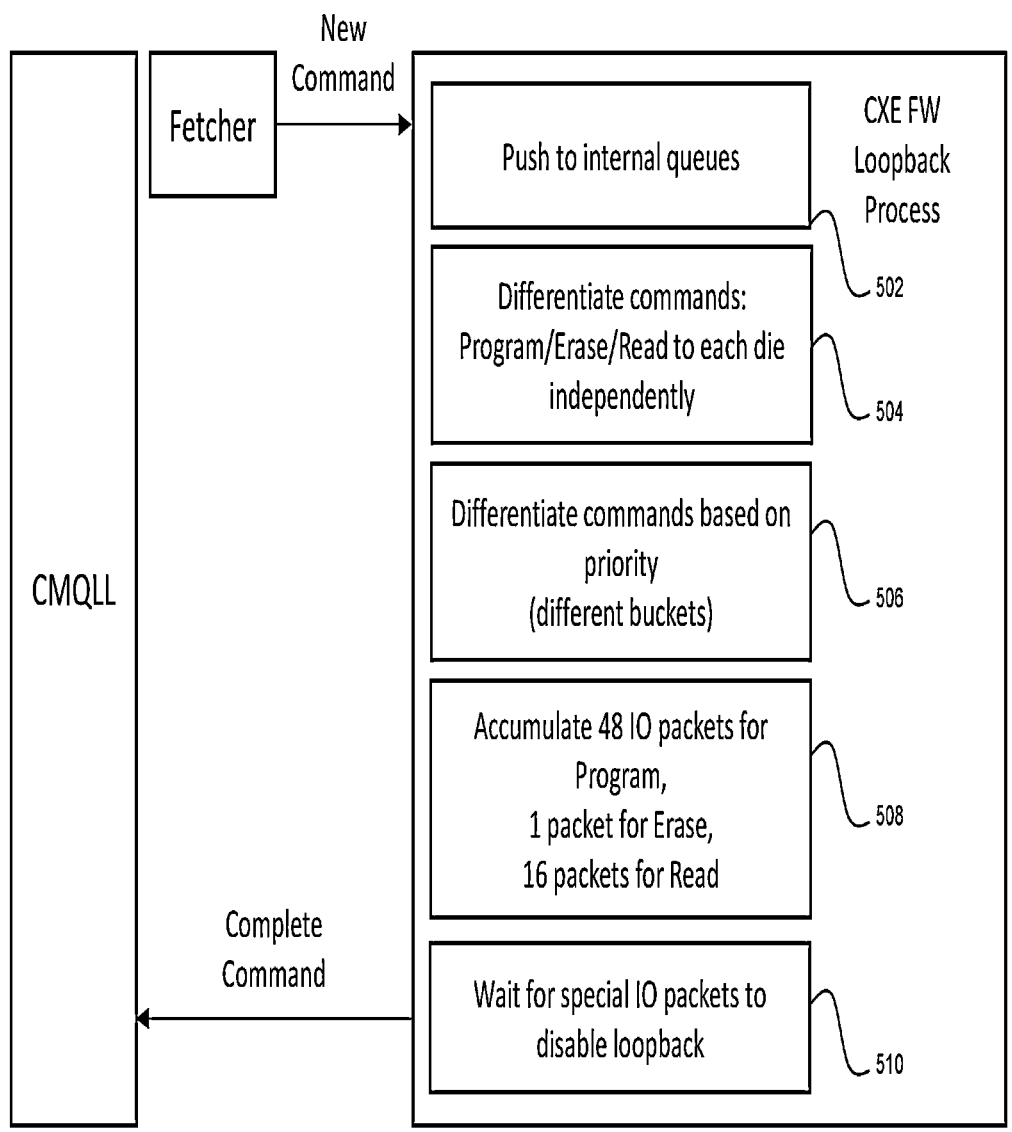
FIG. 5 shows an example flow diagram of the loopback process based on some embodiments of the disclosed technology.

FIG. 5 shows an example flow diagram of the loopback process based on some embodiments of the disclosed technology.

In some embodiments of the disclosed technology, a loopback process is activated right after a NAND command abort procedure, and the loopback process is terminated only after receiving a special resume operation code that disables the loopback and switches the process back to a NAND die processing. Once the loopback process is activated, operations that would have been performed through a normal command path can be performed through a different command path. In some implementations, once the loopback process is activated, IO packets are accumulated based on the type and priority of the command, and once the threshold is reached, a response is immediately sent back. This process can be performed very effectively for a small number of commands in the queues and shows the acceptable timings.

Referring to FIG. 5, in some implementations, once a loopback process is activated, new commands that are internally queued (502) can be classified into program/erase/read commands (504) and/or the internally queued commands are differentiated based on their priority (506). In some implementations, IO packets are accumulated until a predetermined threshold is reached, based on the type and priority of the command. For example, IO packets for program are accumulated until 48 packets are accumulated, IO packets for erase are accumulated until 1 packet is accumulated, and IO packets for read are accumulated until 16 packets are accumulated (508). The loopback process is terminated in response to receiving a special IO packet for disabling the loopback process (510).

Figure 6:
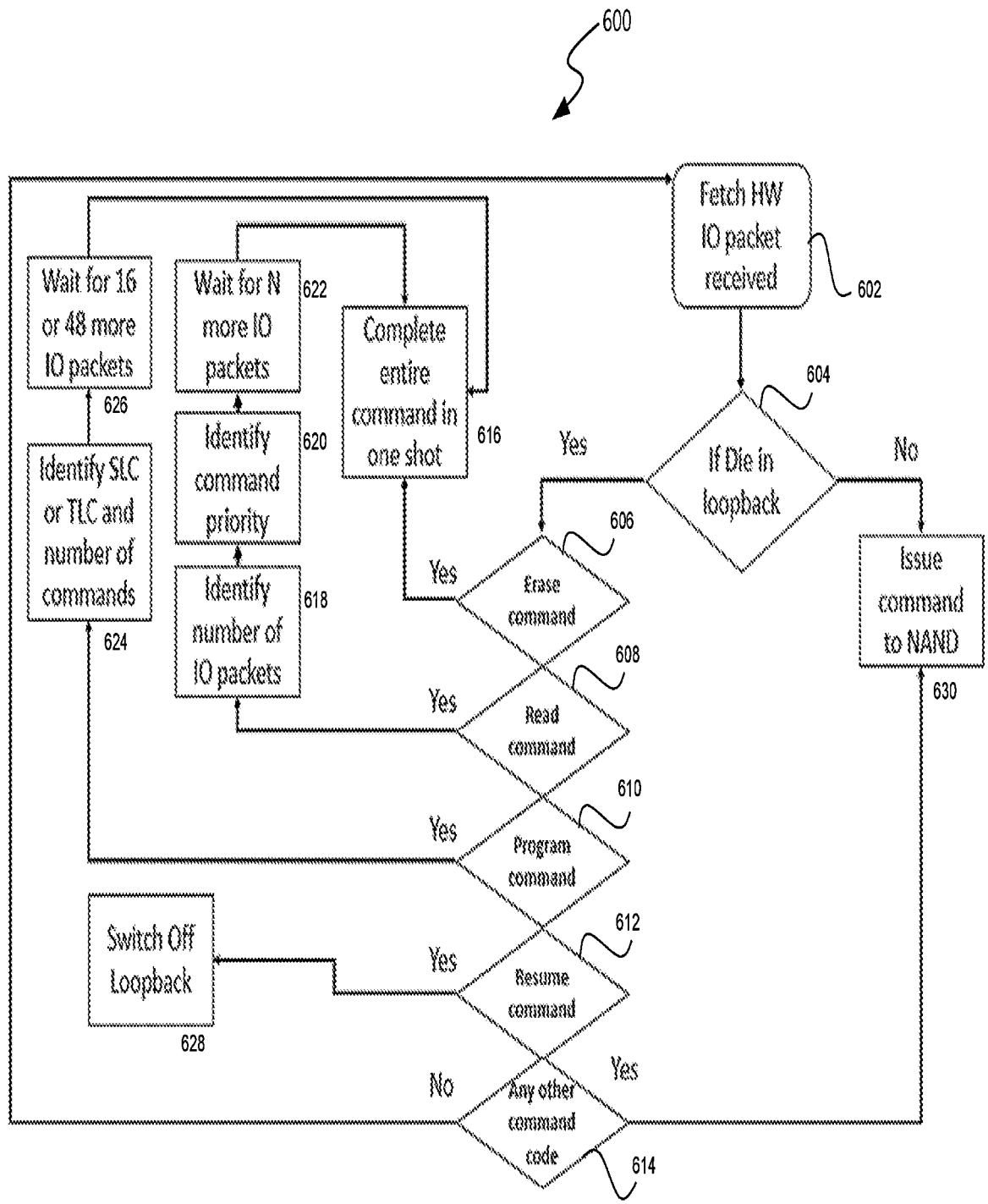
FIG. 6 shows an example algorithm diagram of a command loopback based on some embodiments of the disclosed technology.

FIG. 6 shows an example algorithm diagram of a command loopback based on some embodiments of the disclosed technology.

In some implementations, a command loopback method 600 may fetch hardware input/output (HW IO) packets corresponding to a semiconductor memory die at 602, and at 604 may determine whether a loopback process is being performed on the die. If the loopback process is not being performed on the die, a command can be issued to the semiconductor memory die (e.g., NAND flash die) at 630. If the loopback process is not being performed on the die, the command loopback method 600 determines whether the issued command is an "erase" command (606), whether the issued command is a "read" command (608), whether the issued command is a "program" command (610), whether the issued command is a "resume" command (612), or whether the issued command corresponds to any other command code (614). Upon a determination that the issued command is an "erase" command, the execution of the entire command is completed in one slot (616). Upon a determination that the issued command is a "read" command, the command loopback method may, at 618, identify the number of IO packets, and at 620, identify the priority of the IO packets, and at 622, wait for N more IO packets to proceed to 616. For example, the command loopback method may wait until the number of IO packets with a certain priority reaches a predetermined number. Upon a determination that the issued command is a "program" command, the command loopback method may identify whether the program command corresponds to a single level cell (SLC) program operation or a triple level cell (TLC) program operation, and identify the number of commands, and at 626, wait for 16 or 48 more IO packets to proceed to 616. Upon a determination that the issued command is a "resume" command, the command loopback method may switch off the loopback process (628).

Figure 7:
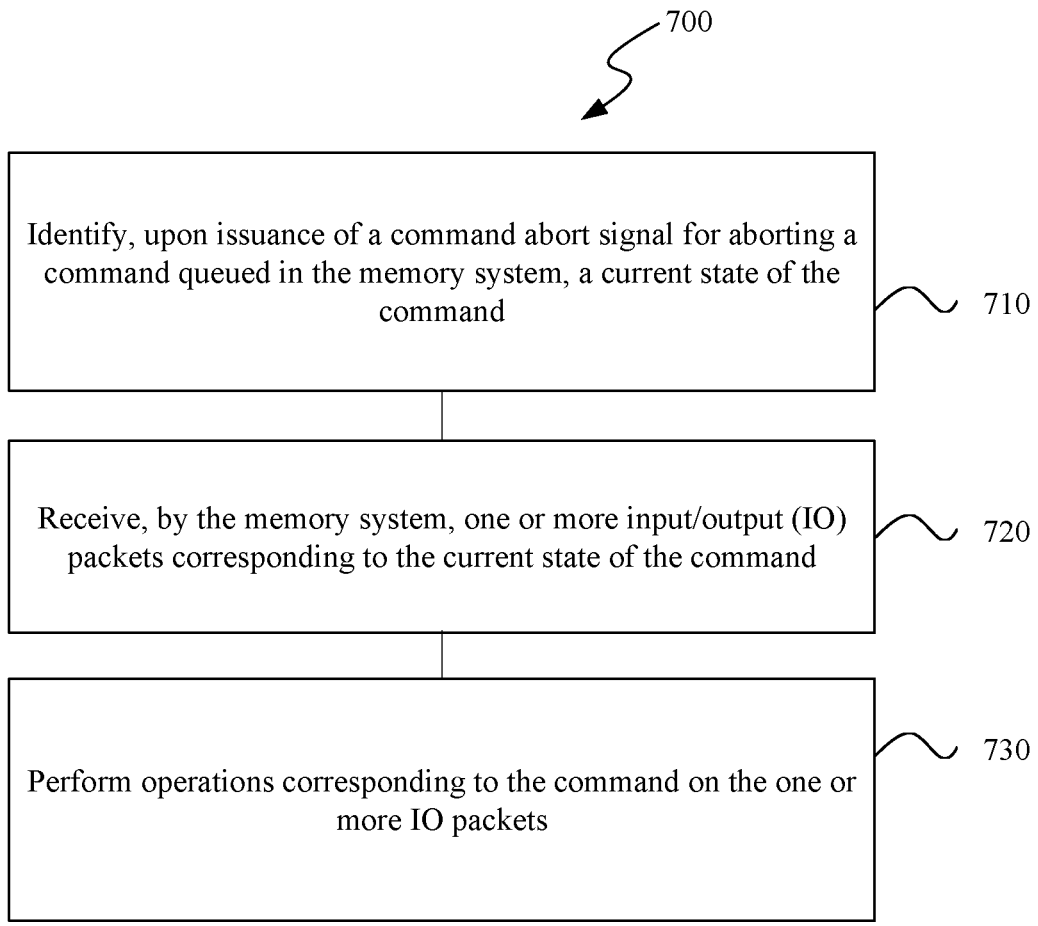
FIG. 7 is a flow diagram that illustrates an example method for operating a memory system based on some embodiments of the disclosed technology.

FIG. 7 is a flow diagram that illustrates an example method 700 for operating a memory device based on some embodiments of the disclosed technology.

In some implementations, the method 700 includes, at 710, identifying, upon issuance of a command abort signal for aborting a command queued in the memory system, a current state of the command, at 720, receiving, by the memory system, one or more input/output (IO) packets corresponding to the current state of the command, and at 730, performing operations corresponding to the command on the one or more IO packets.

Figure 8:
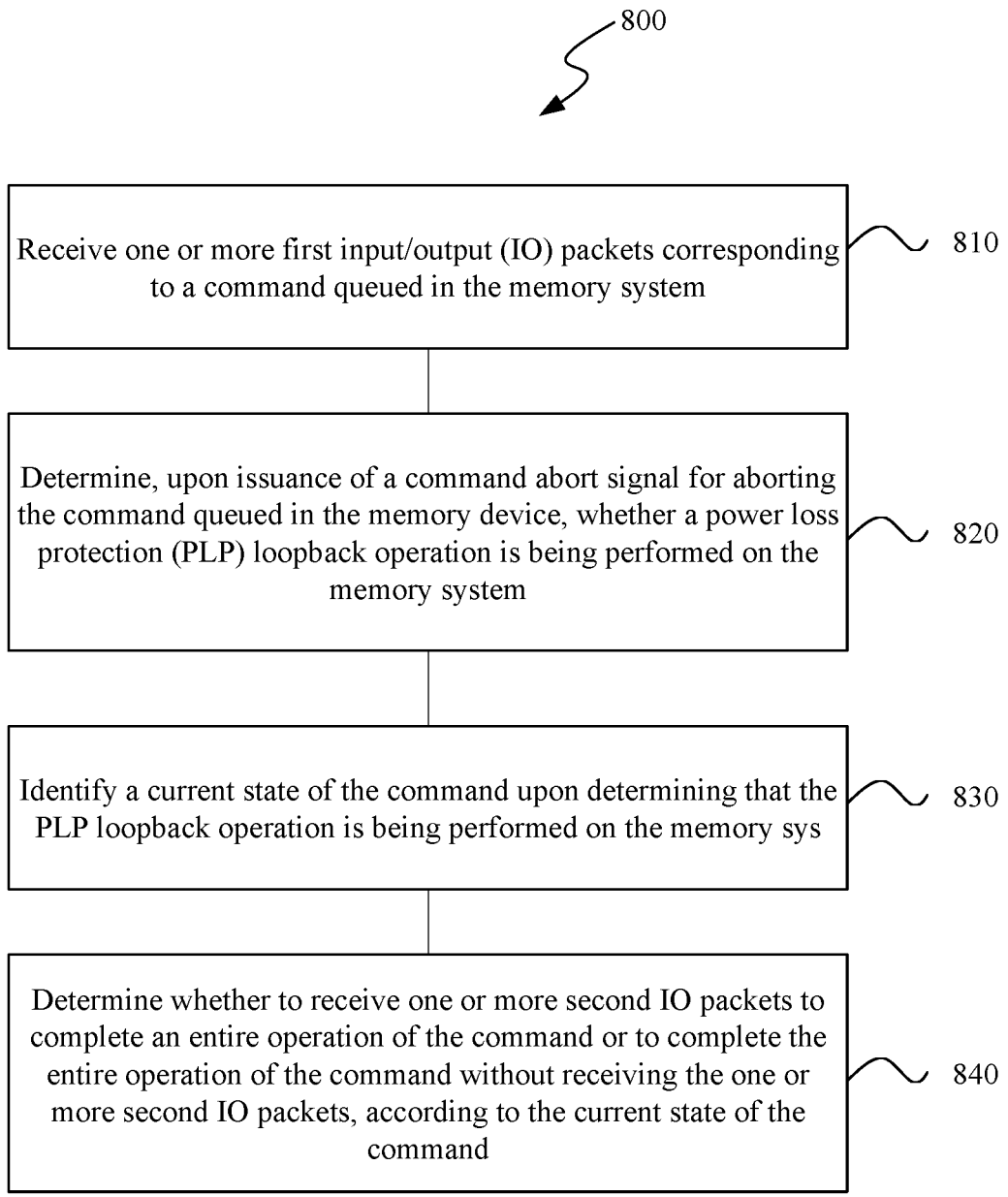
FIG. 8 is a flow diagram that illustrates another example method for operating a memory system based on some embodiments of the disclosed technology.

FIG. 8 is a flow diagram that illustrates another example method 800 for operating a memory system based on some embodiments of the disclosed technology.

In some implementations, the method 800 includes, at 810, receiving one or more first input/output (IO) packets corresponding to a command queued in the memory system, at 820, determining, upon issuance of a command abort signal for aborting the command queued in the memory device, whether a power loss protection (PLP) loopback operation is being performed on the memory system, at 830, identifying a current state of the command upon determining that the PLP loopback operation is being performed on the memory system, and at 840, determining whether to receive one or more second IO packets to complete an entire operation of the command or to complete the entire operation of the command without receiving the one or more second IO packets, according to the current state of the command.

Figure 9:
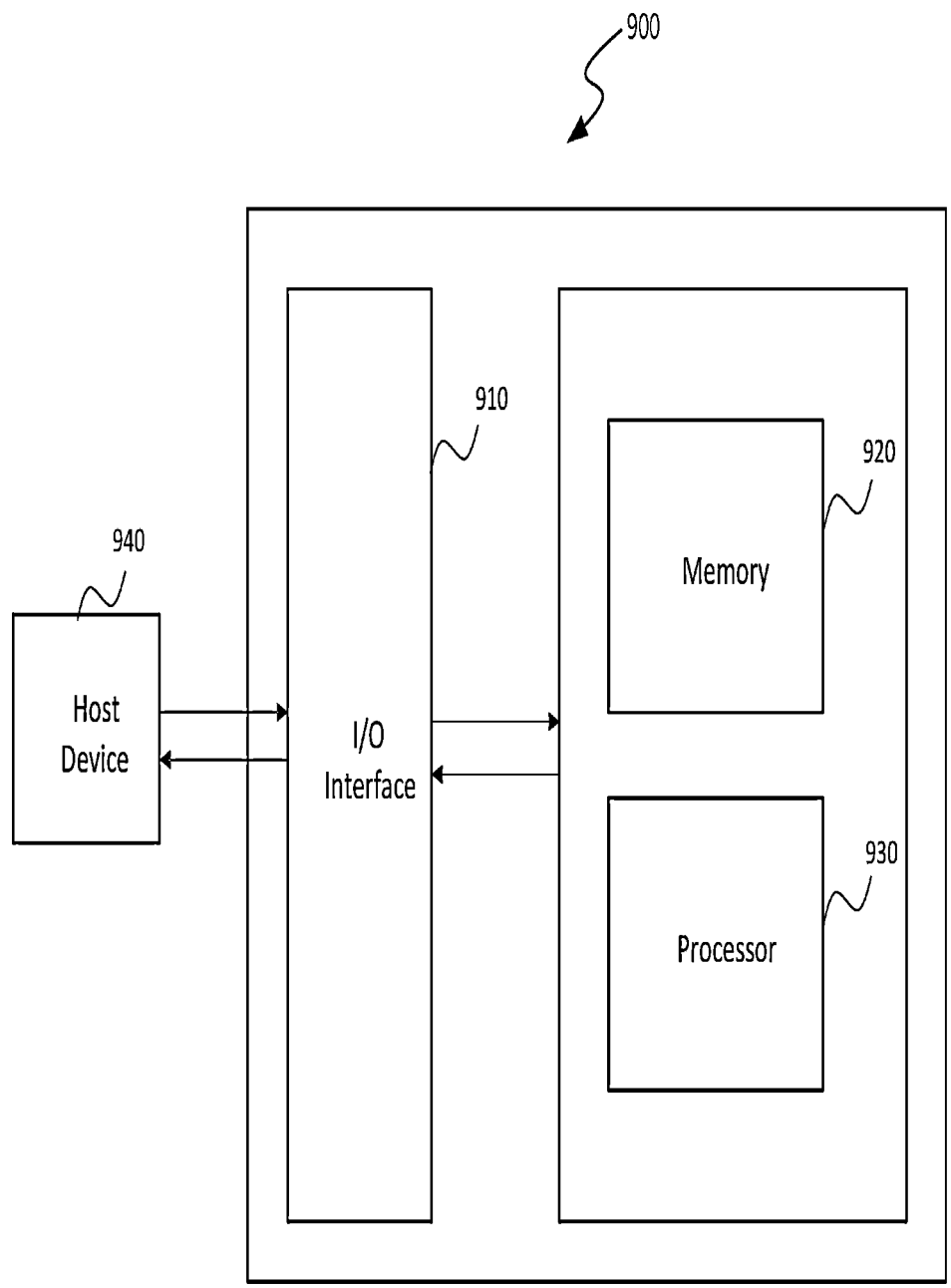
FIG. 9 shows an example of a memory system based on some embodiments of the disclosed technology.

FIG. 9 shows an example of a memory system 900 based on some embodiments of the disclosed technology.

In some embodiments of the disclosed technology, the memory system 900 may include an I/O interface 910 communicatively coupled to a host device 940 to receive a command and input/output (IO) packets corresponding to the command, a memory 920 to store executable instructions, and a processor 930 in communication with the memory, configured to read the executable instructions from the memory to: identify, upon issuance of a command abort signal for aborting a command queued in the memory system, a current state of the comma; receive one or more IO packets corresponding to the current state of the command; and perform operations corresponding to the command on the one or more IO packets.

Therefore, various implementations of features of the disclosed technology can be made based on the above disclosure, including the examples listed below.

Example 1. A method for operating a memory system, comprising: identifying, upon issuance of a command abort signal for aborting a command queued in the memory system, a current state of the command; receiving, by the memory system, one or more input/output (IO) packets corresponding to the current state of the command; and performing operations corresponding to the command on the one or more IO packets.

Example 2. The method of example 1, further comprising generating a response signal to indicate the command has been successfully completed.

Example 3. The method of example 1, wherein the command abort signal is generated by a power loss protection procedure upon occurrence of a power loss event.

Example 4. The method of example 1, wherein the current state of the command includes whether the command queued is a program command, a read command, or an erase command.

Example 5. The method of example 1, wherein the current state of the command includes a number of IO packets that are already transferred according to the command.

Example 6. The method of example 1, wherein the current state of the command includes a phase of the command queued in the memory system.

Example 7. The method of example 1, wherein the current state of the command is determined based on whether the command queued is capable of being completed using a backup power.

Example 8. A method for operating a memory system, comprising: receiving one or more first input/output (IO) packets corresponding to a command queued in the memory system; determining, upon issuance of a command abort signal for aborting the command queued in the memory device, whether a power loss protection (PLP) loopback operation is being performed on the memory system; identifying a current state of the command upon determining that the PLP loopback operation is being performed on the memory system; and determining whether to receive one or more second IO packets to complete an entire operation of the command or to complete the entire operation of the command without receiving the one or more second IO packets, according to the current state of the command.

Example 9. The method of example 8, further comprising performing operations corresponding to the command on the first IO packets only or both the first and second IO packets.

Example 10. The method of example 8, wherein, upon a determination that the current state of the command indicates the command queued is a read command, determining whether to receive the one or more second IO packets according to the current state of the command includes identifying a number of the first IO packets received.

Example 11. The method of example 8, wherein, upon a determination that the current state of the command indicates the command queued is a read command, determining whether to receive the one or more second IO packets according to the current state of the command includes identifying a priority of the command received.

Example 12. The method of example 8, wherein, upon a determination that the current state of the command indicates the command queued is a program command, determining whether to receive the one or more second IO packets according to the current state of the command includes identifying whether the program command corresponds to writing one bit of data per memory cell or writing more than one bit of data per memory cell.

Example 13. The method of example 8, wherein, upon a determination that the current state of the command indicates the command queued is an erase command, determining whether to complete the entire operation of the command includes performing an erase operation without receiving the one or more second IO packets.

Example 14. The method of example 8, further comprising terminating the PLP loopback operation, upon a determination that the current state of the command indicates the command queued is a resume command.

Example 15. A memory system, comprising: an I/O interface communicatively coupled to a host device to receive a command and input/output (IO) packets corresponding to the command; a memory to store executable instructions; and a processor in communication with the memory, configured to read the executable instructions from the memory to: identify, upon issuance of a command abort signal for aborting a command queued in the memory system, a current state of the command; receive one or more IO packets corresponding to the current state of the command; and perform operations corresponding to the command on the one or more IO packets.

Example 16. The memory system of example 15, wherein the processor is further configured to read the executable instructions from the memory to generate a response signal to indicate the command has been successfully completed.

Example 17. The memory system of example 15, wherein the command abort signal is generated by a power loss protection procedure upon occurrence of a power loss event.

Example 18. The memory system of example 15, wherein the current state of the command includes whether the command queued is a program command, a read command, or an erase command.

Example 19. The memory system of example 15, wherein the current state of the command includes a number of IO packets that are already transferred according to the command.

Example 20. The memory system of example 15, wherein the current state of the command includes a phase of the command queued in the memory system.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for operating a memory system, comprising:
   identifying, upon issuance of a command abort signal for aborting a command queued in the memory system, a current state of the command;
   receiving, by the memory system, one or more input/output (IO) packets corresponding to the current state of the command until a predetermined threshold corresponding to the command is reached, wherein the predetermined threshold is determined based on a type of the command and a number of already received IO packets; and
   generating, upon determining that the predetermined threshold corresponding to the command has been reached, a response signal to indicate the command has been successfully completed without performing operations corresponding to the command on the one or more IO packets through a normal command path, wherein the response signal is generated during a power loss protection (PLP) loopback operation that simulates normal command completion without executing the command on the memory system.

2. The method of claim 1, wherein the command abort signal is generated by a power loss protection procedure upon occurrence of a power loss event.

3. The method of claim 1, wherein the current state of the command includes whether the command queued is a program command, a read command, or an erase command.

4. The method of claim 1, wherein the current state of the command includes a number of IO packets that are already transferred according to the command.

5. The method of claim 1, wherein the current state of the command includes a phase of the command queued in the memory system.

6. The method of claim 1, wherein the current state of the command is determined based on whether the command queued is capable of being completed using a backup power.

7. The method of claim 1, wherein the predetermined threshold depends on a type or a priority of the command.

8. A method for operating a memory system, comprising:
   receiving one or more first input/output (IO) packets corresponding to a command queued in the memory system;
   determining, upon issuance of a command abort signal for aborting the command queued in the memory system, whether a power loss protection (PLP) loopback operation is being performed on the memory system to indicate the command has been successfully completed without performing operations corresponding to the command through a normal command path;

identifying a current state of the command upon determining that the PLP loopback operation is being performed on the memory system;

determining whether a predetermined threshold corresponding to the command has been reached, wherein the predetermined threshold is determined based on a type of the command and a number of already received IO packets;

receiving one or more second IO packets in addition to the one or more first IO packets to complete an entire operation of the command by indicating the command has been successfully completed, upon determining that the predetermined threshold corresponding to the command has not been reached, or completing the entire operation of the command by indicating the command has been successfully completed without additionally receiving the one or more second IO packets, upon determining that the predetermined threshold corresponding to the command has been reached, wherein a response signal is generated to indicate the command has been successfully completed without performing operations corresponding to the command on the one or more second IO packets through the normal command path, wherein the response signal is generated during the PLP loopback operation that simulates normal command completion without executing the command on the memory system.

9. The method of claim 8, further comprising performing operations corresponding to the command on the first IO packets only or both the first and second IO packets.

10. The method of claim 8, wherein, upon a determination that the current state of the command indicates the command queued is a read command, determining whether to receive the one or more second IO packets according to the current state of the command includes identifying a number of the first IO packets received.

11. The method of claim 8, wherein, upon a determination that the current state of the command indicates the command queued is a read command, determining whether to receive the one or more second IO packets according to the current state of the command includes identifying a priority of the command received.

12. The method of claim 8, wherein, upon a determination that the current state of the command indicates the command queued is a program command, determining whether to receive the one or more second IO packets according to the current state of the command includes identifying whether the program command corresponds to writing one bit of data per memory cell or writing more than one bit of data per memory cell.

13. The method of claim 8, wherein, upon a determination that the current state of the command indicates the command queued is an erase command, indicating the command has been successfully completed without additionally receiving the one or more second IO packets includes performing an erase operation without receiving the one or more second IO packets.

14. The method of claim 8, further comprising terminating the PLP loopback operation, upon a determination that the current state of the command indicates the command queued is a resume command.

15. The method of claim 8, wherein the predetermined threshold depends on a type or a priority of the command.

16. A memory system, comprising:
an I/O interface communicatively coupled to a host device to receive a command and input/output (IO) packets corresponding to the command;
a memory to store executable instructions; and
a processor in communication with the memory, configured to read the executable instructions from the memory to:
identify, upon issuance of a command abort signal for aborting a command queued in the memory system, a current state of the command;
receive one or more IO packets corresponding to the current state of the command until a predetermined threshold corresponding to the command is reached, wherein the predetermined threshold is determined based on a type of the command and a number of already received IO packets; and
generate, upon determining that the predetermined threshold corresponding to the command has been reached, a response signal to indicate the command has been successfully completed without performing operations corresponding to the command on the one or more IO packets through a normal command path, wherein the response signal is generated during a power loss protection (PLP) loopback operation that simulates normal command completion without executing the command on the memory system.

17. The memory system of claim 16, wherein the command abort signal is generated by a power loss protection procedure upon occurrence of a power loss event.

18. The memory system of claim 16, wherein the current state of the command includes whether the command queued is a program command, a read command, or an erase command.

19. The memory system of claim 16, wherein the current state of the command includes a number of IO packets that are already transferred according to the command.

20. The memory system of claim 16, wherein the current state of the command includes a phase of the command queued in the memory system.

* * * * *